(12) United States Patent
MacQueen et al.

(10) Patent No.: US 12,243,064 B2
(45) Date of Patent: Mar. 4, 2025

(54) MICRO-MOMENT/NUANCED PERSONALIZATION CROSS CHANNEL ECO-SYSTEM

(71) Applicant: BANK OF AMERICA CORPORATION, Charlotte, NC (US)

(72) Inventors: Karen Lea MacQueen, Lyndhurst, OH (US); James I. Brown, Boston, MA (US); Jorge E. Camargo, Los Angeles, CA (US); Victoria L. Dravneek, Charlotte, NC (US); Thomas D. Ellis, Charlotte, NC (US); Murthy Peri, Charlotte, NC (US); Leslie Richard Rhyne, Bend, OR (US); Wendy M. Wekke, Wilmington, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 134 days.

(21) Appl. No.: 17/548,724

(22) Filed: Dec. 13, 2021

(65) Prior Publication Data
US 2022/0405778 A1 Dec. 22, 2022

Related U.S. Application Data

(60) Provisional application No. 63/211,835, filed on Jun. 17, 2021.

(51) Int. Cl.
*G06Q 30/0202* (2023.01)
*G06Q 30/016* (2023.01)

(52) U.S. Cl.
CPC ....... *G06Q 30/0202* (2013.01); *G06Q 30/016* (2013.01)

(58) Field of Classification Search
CPC .... G06Q 30/0202; G06Q 30/016; G06F 8/38; G06N 20/00
See application file for complete search history.

(56) References Cited

U.S. PATENT DOCUMENTS

2014/0032259 A1* 1/2014 LaFever ............... G06Q 50/265
705/7.29
2014/0278896 A1* 9/2014 Anand ................... G06Q 50/01
705/14.32

(Continued)

FOREIGN PATENT DOCUMENTS

WO WO-2019210391 A1 * 11/2019 ......... G06F 21/6245

OTHER PUBLICATIONS

Gajos, Krzysztof Z., Daniel S. Weld, and Jacob O. Wobbrock. "Automatically generating personalized user interfaces with Supple." Artificial intelligence 174.12-13 (2010): 910-950. (Year: 2010).*

(Continued)

*Primary Examiner* — Mehmet Yesildag
*Assistant Examiner* — Thomas Yih Ho
(74) *Attorney, Agent, or Firm* — Moore & Van Allen PLLC; Nicholas C. Russell

(57) ABSTRACT

Embodiments of the present invention provides a micromoment or nuanced personalization eco-system for a user interaction with an entity via any channel. The system first preforms a gauge of the user's level with personalization of interactions and channels via rule set and clustering analysis. System then inputs and creates a forecasted algorithm for the user personalization. The invention further utilized micro-movement capture to identify micro changes to user visualization and conforms presentations based on the micromovements. The invention further provides a backend feedback loop model to identify personalization levels for each user.

17 Claims, 5 Drawing Sheets

(56) References Cited

U.S. PATENT DOCUMENTS

| | | | | |
|---|---|---|---|---|
| 2016/0034705 | A1* | 2/2016 | Horvitz | G06F 21/6245 |
| | | | | 726/26 |
| 2016/0094391 | A1* | 3/2016 | Bahram Pour | H04L 67/10 |
| | | | | 709/221 |
| 2017/0278133 | A1* | 9/2017 | Corrado | H04L 12/4625 |
| 2018/0349793 | A1* | 12/2018 | Triolo | G06N 5/048 |
| 2019/0227693 | A1* | 7/2019 | Liao | G06F 3/012 |
| 2020/0057661 | A1* | 2/2020 | Bendfeldt | G06V 40/70 |
| 2021/0012371 | A1* | 1/2021 | Bikumala | H04L 67/564 |
| 2021/0126904 | A1* | 4/2021 | Kakugwa | G06Q 30/0631 |
| 2021/0390190 | A1* | 12/2021 | Walker | G06Q 30/0236 |
| 2021/0390196 | A1* | 12/2021 | Lavine | H04L 63/102 |
| 2022/0036377 | A1* | 2/2022 | Seibel | G06Q 30/08 |
| 2022/0092578 | A1* | 3/2022 | Ashok | G06F 9/454 |
| 2022/0100893 | A1* | 3/2022 | Kussmaul | G06F 21/577 |
| 2022/0121731 | A1* | 4/2022 | Groth | G06F 21/6263 |

OTHER PUBLICATIONS

Albashrawi, Mousa, and Luvai Motiwalla. "Privacy and personalization in continued usage intention of mobile banking: An integrative perspective." Information Systems Frontiers 21 (2019): 1031-1043. (Year: 2019).*

Silva, Leonardo Souza, Ricardo Nakamura, and Fatima LS Nunes. "Machine Learning in Information Visualization: Using Rule-based Learning Algorithms to Personalize Interfaces." 2020 International Conference on Systems, Signals and Image Processing (IWSSIP). IEEE, 2020. (Year: 2020).*

* cited by examiner

MICRO-MOMENT/NUANCED PERSONALIZATION CROSS CHANNEL ECO-SYSTEM

CROSS-REFERENCE TO RELATED APPLICATIONS

This application is a U.S. Non-provisional application claiming priority to U.S. Provisional Patent Application No. 63/211,835, filed Jun. 17, 2021 titled Micro-Moment/Nuanced Personalization Cross Channel Eco-System, the contents of which are hereby incorporated by reference in its entirety.

BACKGROUND

Advancements in technology allow for a user to interact via multiple channels. The channels available allow a user to customize their devices with application for various channel interactions. However, a need exists for micro-movement personalization for cross channel eco-systems.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the invention provide for a micro-movement and nuanced personalization cross channel eco-system. The invention creates a micro-moment or nuanced personalization eco-system for a user interaction with an entity via any channel. The invention creates a micro-moment or nuanced personalization eco-system for a user interaction with an entity via any channel. The system first preforms a gauge of the user's comfort level with personalization of interactions, channels, or the like. In this way, the system learns each user's comfort level or acceptance level with personalization. This may be done via rule set and clustering leveraging datasets to generate personas of users and to group users into clusters of receiving more or less personalization. System may also create a forecasted algorithm for the user and their personalization. If a user requests a specific level of personalization then it forecasts what future elements the user may be accepting of with respect to personalization and products. The system may further provide the user with a value exchange for personalization of the user interaction and allows for user control of use and distribution of information.

The system further utilized micro movement capture to identify micro changes to user visualization to identify micro changes that the user responds better to, such as colors, regional dialect for audio presentation, fonts, items displayed on screens, or the like. The system then identifies those items and presents more of those colors or items to that particular user.

The system further provides a backend feedback loop model to identify when personalization is right on point, not enough, or goes too far, such that the system may be able to, in real-time, adjust for the user specific needs in personalization at the time of interaction.

Embodiments of the present invention provides a micro-moment or nuanced personalization eco-system for a user interaction with an entity via any channel. The system first preforms a gauge of the user's level with personalization of interactions and channels via rule set and clustering analysis. System then inputs and creates a forecasted algorithm for the user personalization. The invention further utilized micro-movement capture to identify micro changes to user visualization and conforms presentations based on the micro-movements. The invention further provides a backend feedback loop model to identify personalization levels for each user.

Embodiments of the invention relate to systems, methods, and computer program products for micro-movement personalization across channels, the invention comprising: identifying customer acceptance level with channel personalization, wherein gauging the customer acceptance level further comprises performing a rules set and clustering analysis of the customer and generation of a forecasting database; presenting a customized level of personalization of channels to the customer, wherein the customized level of personalization of the channels is based on a customer customization level confidence; continually monitoring the level of personalization of channels for the customer and perform correction adjustment to the level of personalization of channels; performing micro-movement analysis to capture micro changes to customer responses to channels and perform real-time micro-movement adjustments to the personalization of the channels; and providing a feedback loop model for customer acceptance level to the forecasting database based on the customer acceptance and use of the personalization of the channels.

In some embodiments, performing a rules set and clustering analysis further comprises creating a micro-moment personalization eco-system for user interaction with an entity via the channels, wherein the rules set and clustering analysis compares the customer acceptance level for personalization of interactions on the channels, by generating personas of group of customers into clusters of receiving more or less personalization.

In some embodiments, generating the forecasting database further comprises receiving a request for a level of personalization from the customer and generating a forecast database of future elements personalization.

In some embodiments, the invention further comprises providing the customer with a value exchange for personalization of the customer interaction.

In some embodiments, the customer customization level confidence further comprises a machine learning application of historic customer customization for identification of an acceptable level of customization and matching the acceptable level in displaying information to the customer.

In some embodiments, the feedback loop model further comprises continually monitoring the level of personalization of channels for the customer and identify activity changes in the customer on the channels including identifying less activity by the customer on a specific channel and/or more activity by the customer on a specific channel and generate a customization to deploy information from the customer to future customers by inputting the activity changes into the feedback loop model.

In some embodiments, customized level of personalization of channels further comprises customization of colors, backgrounds, fonts, and location of selections.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
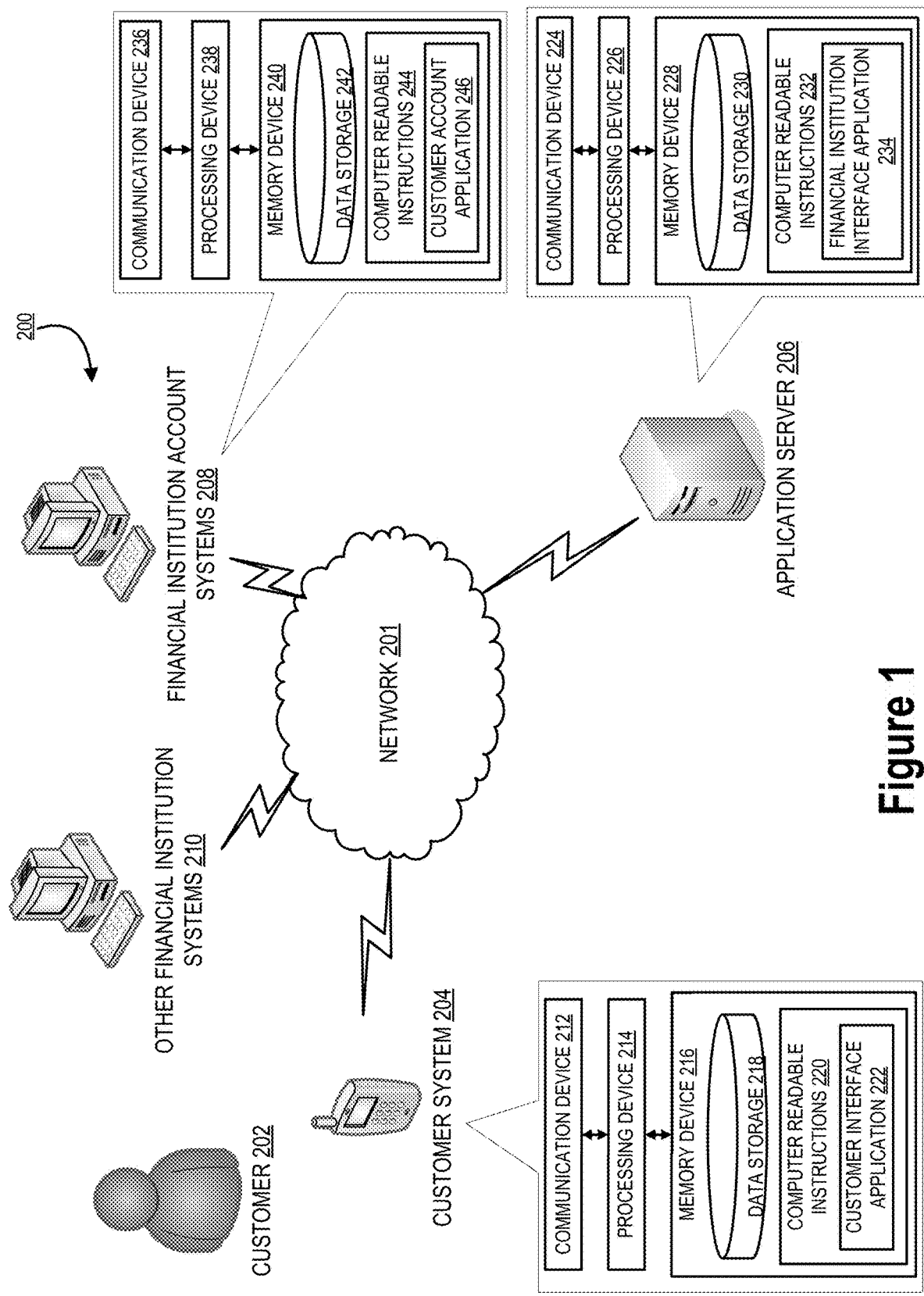
Figure 2:
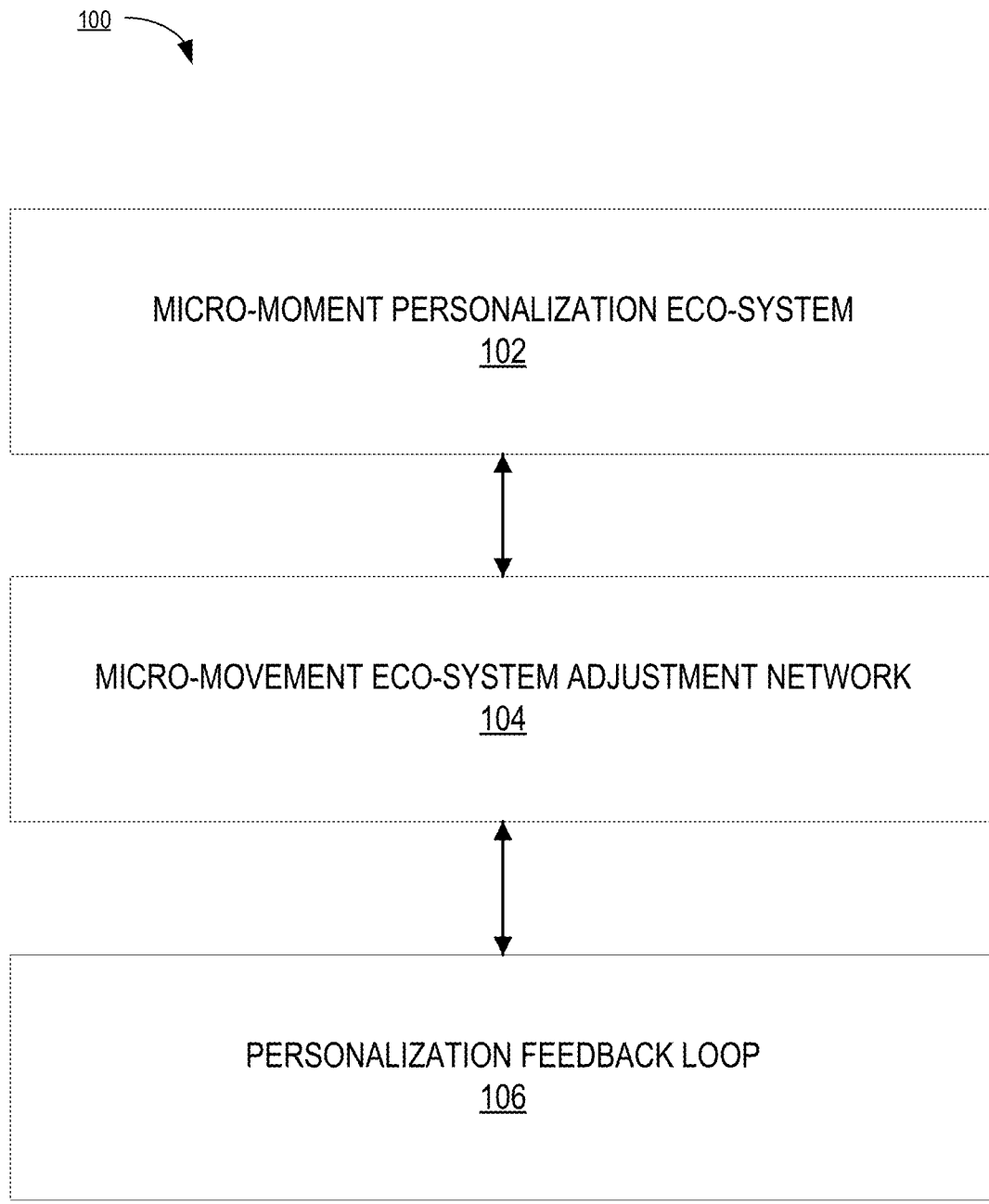
Figure 3:
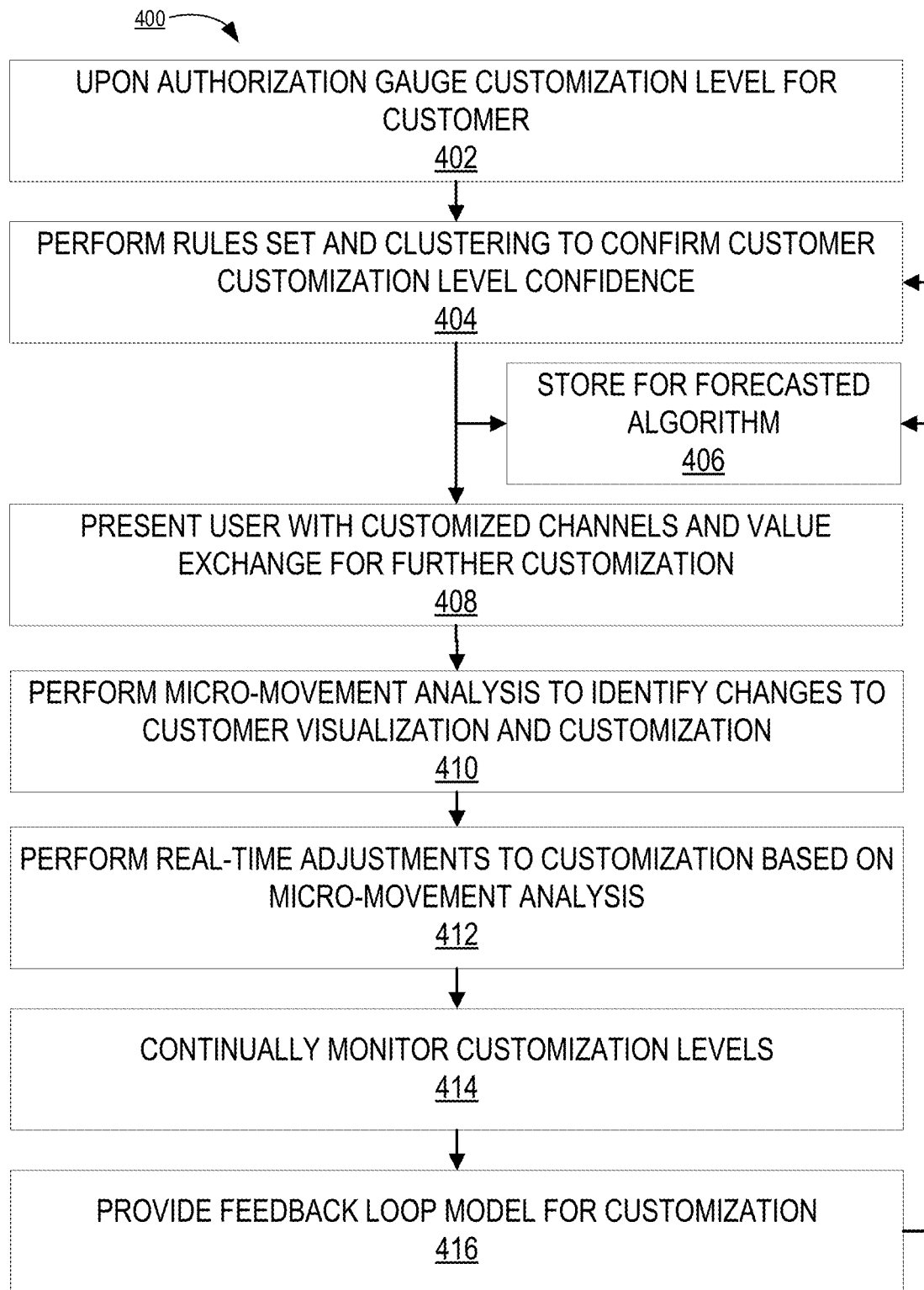
Figure 4:
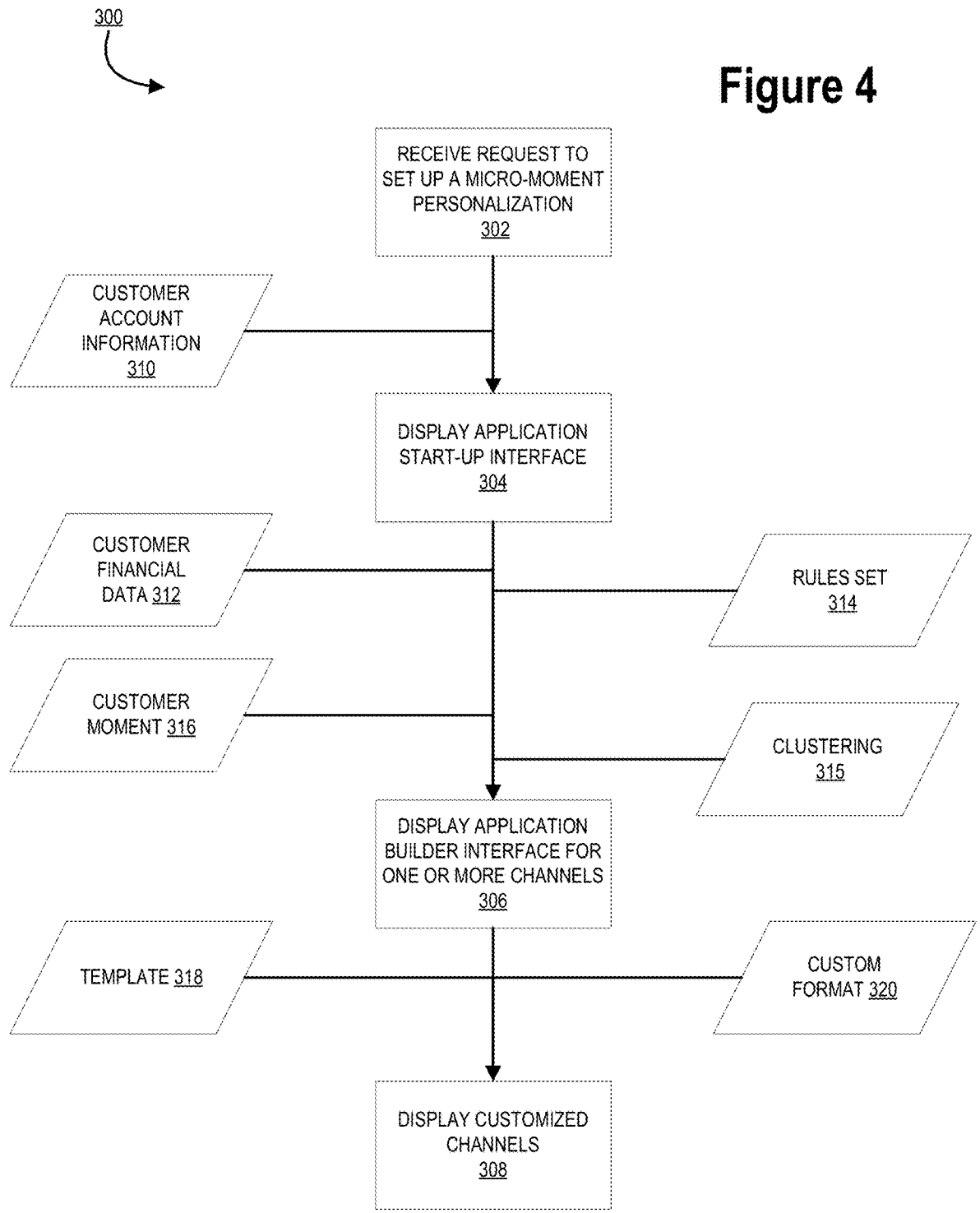
Figure 5:
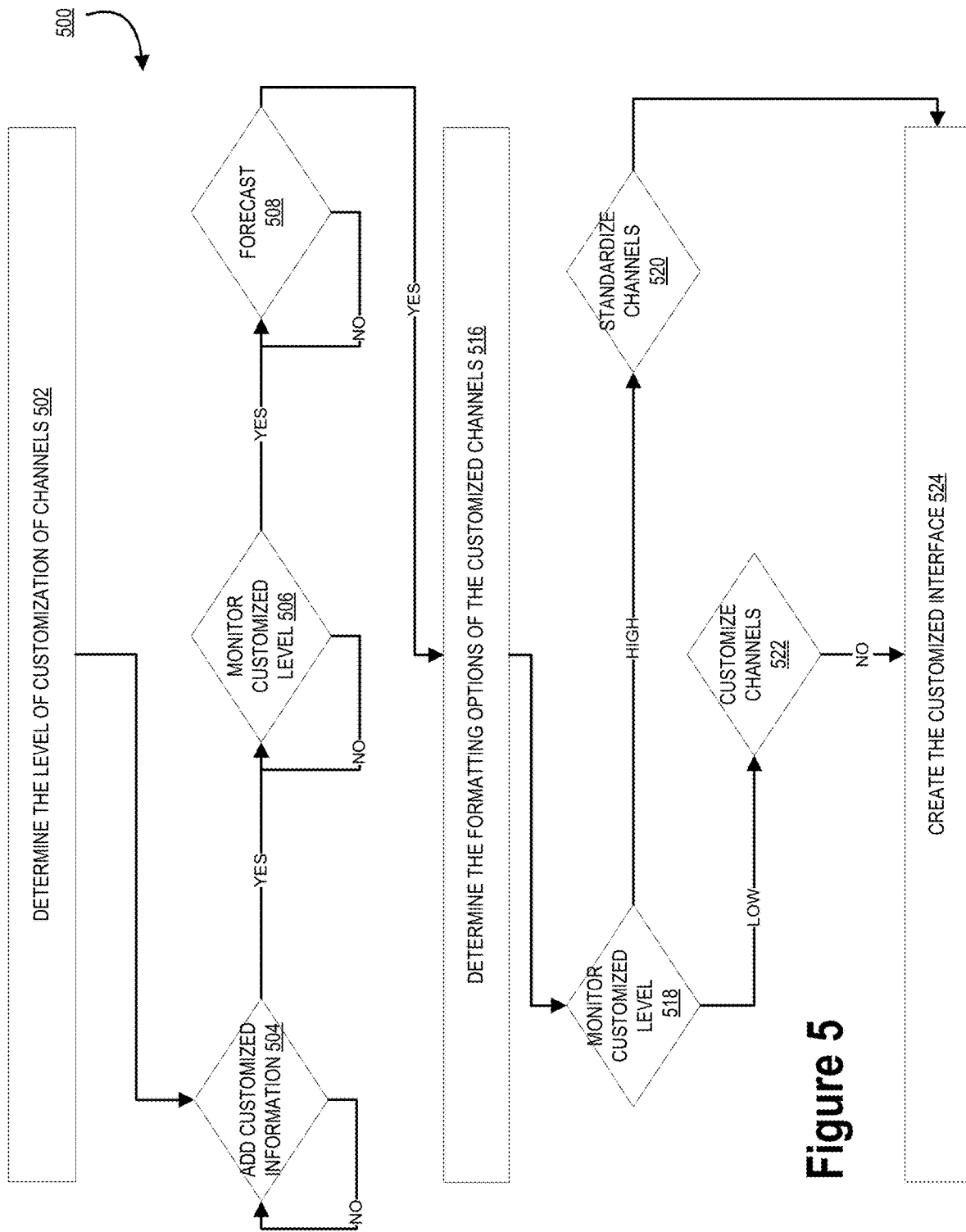

Having thus described embodiments of the invention in general terms, reference will be made to the accompanying drawings, where:

FIG. 1 provides a micro-moment/nuanced personalization cross channel eco-system system environment, in accordance with one embodiment of the present invention;

FIG. 2 provides a high level process flow for micro-moment/nuanced personalization eco-system, in accordance with one embodiment of the present invention;

FIG. 3 provides a high level process flow for the micro-moment personalization process, in accordance with one embodiment of the present invention;

FIG. 4 provides a customized application set-up process flow illustrating the process of setting up the micro-moment personalization eco-system, in accordance with one embodiment of the present invention; and FIG. 5 provides a customized channel builder process flow illustrating the process of creating the personalization eco-system, in accordance with one embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In accordance with embodiments of the invention, an "interaction" may be a transaction, transfer of funds, transfer of resources, credit, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points, or the like. When discussing the resource transfers or transactions are evaluated it could mean that the transactions have already occurred, are in the process of occurring or being processed, or they have yet to be processed/posted by one or more financial institutions.

A "system environment", as used herein, may refer to any information technology platform of an enterprise (e.g., a national or multi-national corporation) and may include a multitude of servers, machines, mainframes, personal computers, network devices, front and back end systems, database system and/or the like.

The invention creates a micro-moment or nuanced personalization eco-system for a user interaction with an entity via any channel. The system first preforms a gauge of the user's comfort level with personalization of interactions, channels, or the like. In this way, the system learns each user's comfort level or acceptance level with personalization. This may be done via rule set and clustering leveraging datasets to generate personas of users and to group users into clusters of receiving more or less personalization. System may also create a forecasted algorithm for the user and their personalization. If a user requests a specific level of personalization then it forecasts what future elements the user may be accepting of with respect to personalization and products. The system may further provide the user with a value exchange for personalization of the user interaction and allows for user control of use and distribution of information.

The system further utilized micro movement capture to identify micro changes to user visualization to identify micro changes that the user responds better to, such as colors, regional dialect for audio presentation, fonts, items displayed on screens, or the like. The system then identifies those items and presents more of those colors or items to that particular user.

The system further provides a backend feedback loop model to identify when personalization is right on point, not enough, or goes too far, such that the system may be able to, in real-time, adjust for the user specific needs in personalization at the time of interaction.

FIG. 1 illustrates a micro-moment/nuanced personalization cross channel eco-system system environment 200, in accordance with an embodiment of the present invention.

As illustrated in FIG. 1, the application server 206 is operatively coupled, via a network 201 to the financial institution account systems 208, other financial institution systems 210, and the customer systems 204. In this way, the application server 206 can send and receive information to and from the financial institution account system 208, the other financial institution systems 210, and the customer system 204, to facilitate building a personalized cross channel eco-system based on micro-moments and nuanced data points. FIG. 1 illustrates only one example of an embodiment of a system and environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination of wireline and wireless communication between devices on the network.

In some embodiments the customer 202 (or "user" as used herein) is an individual that has financial accounts with a financial institution and desires to review and/or compare financial information via a customizable financial institution channels. The accounts used for the customized application are any accounts available to the individual customer 202, such as but not limited to savings accounts, checking accounts, credit card accounts, investment accounts, retirement accounts, mortgage accounts, etc. These accounts include accounts with the customer's primary financial institution, as well as accounts that the customer has with other secondary financial institutions. In some embodiments of the invention the customer 202 is a merchant that has financial accounts with a financial institution and desires to review and/or compare finances via a customizable financial institution application. The accounts used for the customized application are any accounts that are available to the merchant customer 202, such as customer accounts, lease agreements, business accounts, brokerage accounts, expense accounts, and the like. These accounts include accounts with the customer's 202 primary financial institution, as well as accounts with other financial institutions.

As illustrated in FIG. 1, the application server 206 generally comprises of a communication device 224, a processing device 226, and a memory device 228. As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 226 is operatively coupled to the communication device 224 and the memory device 228. The processing device 226 uses the communication device 224 to communicate with the network 201 and other devices on the network 201, such as, but not limited to the financial institution account system 208, the customer system 204, and other financial institution systems 210. As such, the communication device 224 generally comprises a modem, server, or other device for communicating with other devices on the network 201.

As illustrated in FIG. 1, the application server 206 comprises computer-readable instructions 232 stored in the memory device 228, which in one embodiment includes computer-readable instructions 232 for a financial institution interface application 234. In some embodiments, the memory device 228 includes data storage 230 for storing data related to the customized application including, but not limited to the data created and/or used by the financial institution interface application 234.

In the embodiment illustrated in FIG. 1 and described throughout much of this specification, the financial institution interface application 234 allows the customer 202 to determine, via a customer system 204, data to be used and displayed in the customized channels. In one example, the financial institution interface application 234 allows the customer 202 to communicate, via the customer system 204, to indicate the customer account data, customer financial data, customer customized data, and other customer data that the customer 202 wishes to be displayed on the customized application. The data stored within the financial institution interface application 234 provides computer readable instructions 232 to the processing device 226 to allow for development of the customized application. The financial institution interface application 234 stores or accesses information for display in the customized application including, but not limited to, customer accounts, customer financial data, other customer financial data, customer goals, and the like. As used herein, customer account information, customer financial data, other customer financial data, and customer goals may be established by the customer 202 via the customer system 204 or established automatically by the financial institution interface application 234.

In one embodiment, as explained in further detail below, the customer account information available for use in the customized application may be derived from all accounts available to the customer 202. In some embodiments of the invention, the account information may be derived from a primary financial institution, secondary financial institutions, or other business that the customer 202 may use to create an account (i.e. credit card held by retailers). In other embodiments, customer financial data available to use in the customized application may include data provided by the customer 202. For example, customer financial data entered by the customer 202 may comprise of financial information, such as credit cards, mortgages, loans, cash transactions, and other financial information that cannot be accessed by the financial institution interface application 234, such as accounts that are not associated with an online account or accounts associated with institutions that do not allow other financial institutions to access.

As illustrated in FIG. 1, the financial institution account system 208 is generally comprised of a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to the application server 206, the customer system 204, and other financial institution systems 210. As such, the communication device 236 generally comprises a modem, server, or other device for communicating with other devices on the network 201.

As illustrated in FIG. 1, the financial institution account system 208 comprises computer-readable instructions 244 stored in the memory device 240, which in one embodiment includes computer-readable instructions 244 for a customer account application 246. In some embodiments, the memory device 240 includes data storage 242 for storing data related to the micro-moment personalization eco-system, including, but not limited to colors, fonts, term location, account locations, and the like The customer account application 246 also allows for storage in the memory device 240 of customer financial data and personalization data. In this way the customer account application 246 may communicate, via the network 201 with the application server 206 to provide the financial institution interface application 234 other customer data, so that the customer 202 may be able to utilize the other customer data as a comparison with the customer's own data.

As illustrated in FIG. 1 the customer system 204 is generally comprised of a communication device 212, a processing device 214, and a memory device 216. The customer system 204 is a computing system that allows a user to provide information for a customized application, via a network 201, to the financial institution interface application 234. Further, the customer system 204 allows the customer 202 to view the customized application. The processing device 214 is operatively coupled to the communication device 212 and the memory device 216. The processing device 214 uses the communication device 212 to communicate with the network 201 and other devices on the network 201, such as, but not limited to the application server 206, the financial institution account system 208, and other financial institution systems 210. As such, the communication device 212 generally comprises a modem, server, or other device for communicating with other devices on the network 201.

As further illustrated in FIG. 1, the customer system 204 comprises computer-readable instructions 220 stored in the memory device 216, which in one embodiment includes computer-readable instructions 220 for a customer interface application 222. In this way, a customer 202 may be able to access the customized application, such as the application set-up interface and application builder interface, in order to create the customized application using customer account information, customer data, other customer data, customer goals, fonts, colors, sizes, locations of items on a screen, and provide the format for the customized application, using the customer interface application 222. The customer system 204 may be, for example, a desktop personal computer, a mobile system such as a laptop, personal digital assistant ("PDA"), cellular phone, smart phone, or the like. Although only a single customer system 204 is depicted in FIG. 1, the customizable application system and environment 200 may contain numerous customer systems 204.

The other financial institution systems 210 are operatively coupled to the financial institution account system 208, the application server 206, and/or the customer system 204 through the network 201. The other financial institution systems 210 have systems with devices the same or similar to the devices described for the customer system 204, the financial institution account system 208, and the application server 206 (i.e., a communication device, a processing device, and a memory device). Therefore, the other financial institution systems 210 communicates with the financial institution account system 208, the application server 206, and/or the customer system 204 in the same or similar way as previously described with respect to each system. The other financial institution systems 210, in some embodiments, are comprised of systems and devices that allow the customer 202, the financial institution account system 208, and the application server 206 to access account and financial information regarding the customer 202 stored at other financial institutions.

It is understood that the servers, systems and devices described herein illustrate one embodiment of the invention. It is further understood that one or more of the servers, systems, and devices can be combined in other embodiments and still function in the same or similar way as the embodiments described herein.

FIG. 2 provides a high level process flow for micro-moment/nuanced personalization eco-system 100, in accordance with one embodiment of the present invention. The micro-moment/nuanced personalization eco-system comprises three stages including micro-moment personalization eco-system 102, the micro-movement eco-system adjustment network 104, and the personalization feedback loop 106.

In some embodiments, the micro-moment personalization eco-system 102 comprises creating a micro-moment personalization eco-system for user channels. For example, the system identifies micro-moments when the customer performs actions that may be modified in order to present a personalization of the customer's interaction with the various channels. The system may perform a gauge of the customer's comfort with personalization of interactions and channels. The system may learn, via machine learning the level of acceptance a customer may have with personalization of channel displays, communications, or the like. Using machine learning in combination with rule sets and clustering, the system identifies the customer's acceptance of personalization, amount of personalization, and type of personalization. The acceptance of personalization determines how much personalization the customer may like or be comfortable with. The amount of personalization may include how much personalization and which channels may be personalized for the customer. This may include digital, in person, or the like type of personalization. The type of personalization comprises aesthetic items such as color, font, location, textures, or the like that the user may find pleasing. The micro-movement personalization eco-system 102 may further create a forecasted algorithm for the customer and their personalization. If a customer requests a specific level of personalization then it forecasts what future elements the customer may be accepting of with respect to personalization and products. The system may further provide the customer with a value exchange for personalization of the customer interaction and allows for customer control of use and distribution of information.

In some embodiments, the micro-movement eco-system adjustment network 104 comprises a micro-movement capture network that identifies micro changes to user visualization of a screen. In this way, the system identifies changes to how the user responds, such as colors, regional dialect for audio presentation, fonts, items displayed on screens, or the like. The system then identifies those items and presents more of those colors or items to that particular user.

In some embodiments, the personalization feedback loop 106 comprises a backend feedback loop model to identify when personalization is right on point, not enough, or goes too far, such that the system may be able to, in real-time, adjust for the user specific needs in personalization at the time of interaction.

FIG. 3 provides a high level process flow for the micro-moment personalization process 400, in accordance with one embodiment of the present invention. As illustrated in block 402, the process 400 is initiated by gauging the customization level of a customer upon customer authorization. In some embodiments, the system may ask the customer about their level of customization and personalization. In some embodiments, the system may determine the level of customization and personalization based on historical data.

As illustrated in block 404, the process 400 continues by performing rules sets and clustering to confirm customer customization level confidence. In this way, the system utilizes machine learning to identify a level of customization that a customer may be acceptable with and match that level in displaying information to the user. The determination of the customization level confidence is then stored for forecasting in a forecasted algorithm, as illustrated in block 406. The forecasting algorithm is a predictive modeling used to forecast future customer customization levels based on the current customer level determination. In this way, it allows for the system to build a database of varying levels of customization and match a customer to that level.

As illustrated in block 408, the process 400 continues by presenting the customer with customized channels and a value exchange for further customization. In this way, the system may deploy the personalization to the customer channels, such as colors, fonts, location of selections, and the like for multiple customer channels. Furthermore, the system may provide the customer with a value exchange for further customization. In this way, the system may provide the customer with additional customization items that may allow the customer to receive a value in exchange for those customizations.

As illustrated in block 410, the process 400 continues by performing micro-movement analysis and adjustment to identify changes to customer visualization and customization. In this way, the system may notice changes in the movement of the customer and how the customer reacts to fonts, colors, or the like. These micro-movement changes are identified by micro-movement analysis. These changes are then used by the system to perform real-time adjustments to the customization for the user based on the micro-movement analysis, as illustrated in block 412. In this way, the system may, in real-time, modify the customer experience based on micro-movement patterns that the system identifies while the user is interacting with one or more channels.

The system may continually monitor the customization levels, as illustrated in block 414. In this way, the system may identify that the customer is more active on channels based on customization, as such providing an indication that the customer like the customization. In other embodiments, the system may identify less activity by a customer on a specific channel, which may indicate a dissatisfaction with respect to the customization level. The system may then adjust the customization level in accordance with factors.

Finally, the process 400 is completed by providing a feedback loop model for customization to deploy the information from this customer to future customers to better provide a model for future customization predictions, as illustrated in block 416.

FIG. 4 illustrates a customized application set-up process flow illustrating the process of setting up the micro-moment personalization eco-system 300 illustrating the inputs that are used to create the customized application. As illustrated in block 302 a customer may request to set up a micro-movement personalization of channels for a customer via a customer system 204. In some embodiments of the invention the customer 202 can download a customized application to the customer system 204 in order to create customized personalization of channels on the customer system 204. In other embodiments of the invention the customer 202 can create a customized channels within the customer's 202 online banking application provided by the financial institution through the used of the customer system 204.

Once the request is received that the customer 202 wants to create a customized application, the financial institution interface application 234 determines the customer accounts that are available for inclusion in a customized application. In one embodiment of the invention, the customer account information 310 may include all the customer accounts available to the customer through the primary financial institution and secondary financial institutions. For example, the customer 202 may have several accounts, including savings accounts, retirement accounts, checking accounts, investment accounts, or credit card accounts with various financial institutions. These accounts may be included as the customer account information 310 displayed to the customer 202 for ultimate inclusion into the customized account interface. In one embodiment, the customer account information 310 added may be financial accounts from the primary financial institution such as savings accounts, checking accounts, retirement accounts, brokerage accounts, and the like. In other embodiments the customer account information 310 added may be accounts from a secondary financial institution, including accounts such as savings accounts, checking accounts, retirement accounts, brokerage accounts, or the like.

As illustrated in block 304 of FIG. 3, after the customer 202 chooses to create a customized account application, one of the application set-up interface is displayed to the customer 202, depending on the on the type of customer 202. As illustrated by block 304, prior to using the builder interfaces the customer 202 may supply several inputs that the customer 202 may want to include in the customized account interface and channels. The customer 202 may provide financial data in the form of customer financial data 312. The customer financial data 312 may comprise of financial information, such as credit cards, mortgages, loans, and other financial information the financial institution and other financial institutions may have regarding the customer 202. Furthermore, in some embodiments other accounts maybe included within the customer financial data 312 including accounts associated with spouses or dependents, and/or cash transactions made by the customer 202 or other people associated with the customer's accounts.

As illustrated in block 314, the system may apply a rules set to the customer, including customer accounts, customer inputs, and the like to aid in determining a level of personalization the customer is accepting of. The rules set may compare similar customers, customer input, and the like to gauge a level of personalization for the customer. The rules set 314 in combination with clustering 315 allows the system to customize and personalize channels for the customer. Clustering 315 may utilize machine learning in order to predict a user personalization levels in combination with the rules set 314.

The system may further provide for customer moments, as illustrated in block 316. In this way, the system may identify micro movements of the customer to identify changes in the customer's visualization that may provide an indication of locations, fonts, colors, and the like that the customer responds to. These changes may allow the system to change the channel appearances to the customer in real-time to allow for more customer responses to the channel. These customer micro movements 316 allow for real-time changes to customer personalization for keeping customer response and activity.

As illustrated in FIG. 4, once the customer 202 selects the customer financial data 312, customer account information 310, and the customer information is processed using the rule sets 314 and clustering 315, the financial institution interface application 234 receives data from the financial institution account systems 208, the other financial institution systems 210, and/or other systems in the primary or secondary financial institutions or businesses. Thereafter, the financial institution interface application 234 displays the application builder interfaces to the customer 202 to allow the customer 202 to determine how the customer 202 would like the information displayed in the customized application, as illustrated by block 306.

In the application builder interfaces the customer 202 utilizes the account information selected in order to create the customize application. This, along with the rules set and clustering that the system provides the customer allows for a personalization of customer channels. Within the application builder interfaces the customer 202 may request to use a template interface, create their own customized interface, or utilize parts of both. As illustrated by block 318, the template interfaces 318 may be provided by the financial institution, and may organize customer data in ways that the financial institution may think is helpful to its customers 202 based on analysis. In other embodiments of the invention, customers 202 may create their own customized interfaces and save them as templates for other customers 202 use within the financial institution interface application. Still in other embodiments of the invention the customers 202 may select templates to use in the customized application, but thereafter make changes to the template to tailor the customized application to the individual customer's needs. In some embodiments of the invention, the templates include templates designed specifically for interfaces directed to colors, fonts, locations, account management, financial comparisons, and the like.

In other embodiments of the invention, as illustrated by block 320, the customer 202 may provide for a customized format. The customized format allows the customer 202 to format the customized application in any display that they wishes. For example, if the customer 202 wants to display budgeting information on their interface, they may choose a custom format 320 in order to place both budgeting information and also comparison information on their customized channels 308. In utilizing the custom format the customer 202 may be able to customize the data displayed on the customized application 308 in any order or position that the customer 202 feels is most applicable to the customer's 202 own needs.

FIG. 5 provides a customized channel builder process flow illustrating the process of creating the personalization eco-system 500, in accordance with one embodiment of the present invention. As illustrated in block 502, the process 500 first determines the level of customization of channels for the customer. This may be done via rules set, cluster analysis, customer input, or the like. As illustrated in block 504, if customized data is added to the customer channels, the process 500 continues by monitoring the customized levels, as illustrated in block 506. If no customization is performed, the process 500 is delayed until personalization is added to the customer channels. Upon implementing personalization to the customer personalization, the system continues to monitor the customized level, as illustrated in block 506. After monitoring, the system continues by performing a forecast of the level of customization for storage in a database to further predict future customer level of personalization and to feed the cluster analysis and rules set, as illustrated in block 508.

As illustrated in block 516, the process 500 continues by determining the formatting options of the customized channels for the customer. In this way, the system may determine and deploy the formatting options for the customer, such as fonts, colors, sizes, locations, audio, and the like for the various channels. Furthermore, the system may determine the level or amount of the customization for each channel or the individual customer.

The system may continually monitory the customized level for the customer, as illustrated in block 518. If the customization is correct, the system creates the customized interface and channels for the customer. If the customization is too low, the system further customizes the customer channels as illustrated in block 522 and creates the customized interface and channel for the customer, as illustrated in block 524. If the customization is too high, the system adjusts the customization and standardizes the channels, as illustrated in block 520. The system then creates the customized interface and channel for the customer, as illustrated in block 524.

Embodiments of the present invention provides a micromoment or nuanced personalization eco-system for a user interaction with an entity via any channel. The system first preforms a gauge of the user's level with personalization of interactions and channels via rule set and clustering analysis. System then inputs and creates a forecasted algorithm for the user personalization. The invention further utilized micromovement capture to identify micro changes to user visualization and conforms presentations based on the micromovements. The invention further provides a backend feedback loop model to identify personalization levels for each user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for micro-movement personalization across channels, the system comprising:
   one or more memory devices having computer readable code stored thereon;
   one or more processing devices operatively coupled to the one or more memory devices, wherein the one or more processing devices are configured to execute the computer readable code to:
   receive a request from a customer to generate a custom application;
   determine customer accounts for inclusion in the custom application;
   generate the custom application and create custom interfaces and channels, wherein the custom application comprises the customer accounts;
   generate an application builder interface for the customer to customize the custom interfaces and channels;
   identify customer acceptance level with channel personalization, wherein identifying the customer acceptance level further comprises performing clustering analysis of the customer and generation of a forecasting database, wherein the clustering analysis uses a machine learning engine configured to assign a customized level confidence providing the acceptance level the customer has with an amount of personalization on the channels and a type of personalization on the channels, wherein the type of personalization on the channels comprises aesthetics, textures, color, and font;
   generate a persona for the customer acceptance level with channel personalization utilizing a rules set and clustering datasets;
   forecast the channel personalization utilizing the machine learning engine, the persona, and the rules set, wherein the rules set comprises customer accounts, customer inputs, and comparing similar customers and the customer inputs;
   provide the customer with a value exchange for an additional personalization of a customer interaction, wherein the additional personalization of the customer interaction allows for customer control of use and distribution of information;
   receive inputs from the customer for the additional personalization of a customer interaction and updating the custom interfaces and the channels via the application builder interface;
   execute updates to the custom interfaces and the channels based on the inputs from the customer;
   present a customized level of personalization of channels to the customer, wherein the customized level of personalization of the channels is based on a customization level confidence, the persona, and the additional personalization of the customer interaction;
   monitor the level of personalization of channels for the customer;
   perform correction adjustment to the level of personalization of channels based on the monitoring;
   capture micro-movements to determine micro-changes to customer responses based on colors, regional dialects for audio presentation, fonts, and items displayed on screens;
   perform micro-movement analysis to capture micro changes to the customer responses to channels and perform real-time micro-movement adjustments to the personalization of the channels, wherein the real-time micro-movement adjustments modify patterns in the regional dialect, the items displayed on screens, and the fonts and colors of the channels; and provide a feedback loop model for customer acceptance level to the forecasting database based on the customer acceptance, use of the personalization of the channels, and the persona.

2. The system of claim 1, wherein performing a clustering analysis further comprises creating a micro-moment personalization eco-system for user interaction with an entity via the channels, wherein the rules set and clustering analysis compares the customer acceptance level for personalization of interactions on the channels, by generating personas of group of customers into clusters of receiving more or less personalization.

3. The system of claim 1, wherein generating the forecasting database further comprises
receiving a request for a level of personalization from the customer and generating a forecast database of future elements personalization.

4. The system of claim 1, wherein the customer customization level confidence further comprises a machine learning application of historic customer customization for identification of an acceptable level of customization and matching the acceptable level in displaying information to the customer.

5. The system of claim 1, wherein the feedback loop model further comprises continually monitoring the level of personalization of channels for the customer and identify activity changes in the customer on the channels including identifying less activity by the customer on a specific channel and/or more activity by the customer on a specific channel and generate a customization to deploy information from the customer to future customers by inputting the activity changes into the feedback loop model.

6. The system of claim 1, wherein customized level of personalization of channels further comprises customization of colors, backgrounds, fonts, and location of selections.

7. A computer program product for micro-movement personalization across channels with at least one non-transitory computer-readable medium having computer-readable program code portions embodied therein, the computer-readable program code portions comprising:
an executable portion configured for receiving a request from a customer to generate a custom application;
an executable portion configured for determining customer accounts for inclusion in the custom application;
an executable portion configured for generating the custom application and create custom interfaces and channels, wherein the custom application comprises the customer accounts;
an executable portion configured for generating an application builder interface for the customer to customize the custom interfaces and channels;
an executable portion configured for identifying customer acceptance level with channel personalization, wherein identifying the customer acceptance level further comprises performing a clustering analysis of the customer and generation of a forecasting database, wherein the clustering analysis uses a machine learning engine configured to assign a customized level confidence providing the acceptance level the customer has with an amount of personalization on the channels and a type of personalization on the channels, wherein the type of personalization on the channels comprises aesthetics, textures, color, and font;
an executable portion configured for generating a persona for the customer acceptance level with channel personalization utilizing a rules set and clustering datasets;
an executable portion configured for forecasting the channel personalization utilizing the machine learning engine, the persona, and the rules set, wherein the rules set comprises customer accounts, customer inputs, and comparing similar customers and the customer inputs;
an executable portion configured for providing the customer with a value exchange for an additional personalization of a customer interaction, wherein the additional personalization of the customer interaction allows for customer control of use and distribution of information;
an executable portion configured for receiving inputs from the customer for the additional personalization of a customer interaction and updating the custom interfaces and the channels via the application builder interface;
an executable portion configured for executing updates to the custom interfaces and the channels based on the inputs from the customer;
an executable portion configured for presenting a customized level of personalization of channels to the customer, wherein the customized level of personalization of the channels is based on a customization level confidence, the persona, and the additional personalization of the customer interaction;
an executable portion configured for monitoring the level of personalization of channels for the customer;
an executable portion configured for performing correction adjustment to the level of personalization of channels based on the monitoring;
an executable portion configured for capturing micro-movements to determine micro-changes to customer responses based on colors, regional dialects for audio presentation, fonts, and items displayed on screens;
an executable portion configured for performing micro-movement analysis to capture micro changes to customer responses to channels and perform real-time micro-movement adjustments to the personalization of the channels, wherein the real-time micro-movement adjustments modify patterns in the regional dialect, the items displayed on screens, and the fonts and colors of the channels; and
an executable portion configured for providing a feedback loop model for customer acceptance level to the forecasting database based on the customer acceptance, use of the personalization of the channels, and the persona.

8. The computer program product of claim 7, wherein performing a clustering analysis further comprises creating a micro-moment personalization eco-system for user interaction with an entity via the channels, wherein the rules set and clustering analysis compares the customer acceptance level for personalization of interactions on the channels, by generating personas of group of customers into clusters of receiving more or less personalization.

9. The computer program product of claim 7, wherein generating the forecasting database further comprises receiving a request for a level of personalization from the customer and generating a forecast database of future elements personalization.

10. The computer program product of claim 7, wherein the customer customization level confidence further comprises a machine learning application of historic customer customization for identification of an acceptable level of customization and matching the acceptable level in displaying information to the customer.

11. The computer program product of claim 7, wherein the feedback loop model further comprises continually monitoring the level of personalization of channels for the customer and identify activity changes in the customer on the channels including identifying less activity by the customer on a specific channel and/or more activity by the customer on a specific channel and generate a customization to deploy information from the customer to future customers by inputting the activity changes into the feedback loop model.

12. The computer program product of claim 7, wherein customized level of personalization of channels further comprises customization of colors, backgrounds, fonts, and location of selections.

13. A computer-implemented method for micro-movement personalization across channels, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   receiving a request from a customer to generate a custom application;
   determining customer accounts for inclusion in the custom application;
   generating the custom application and create custom interfaces and channels, wherein the custom application comprises the customer accounts;
   generating an application builder interface for the customer to customize the custom interfaces and channels;
   identifying customer acceptance level with channel personalization, wherein identifying the customer acceptance level further comprises performing a clustering analysis of the customer and generation of a forecasting database, wherein the clustering analysis uses a machine learning engine configured to assign a customized level confidence providing the acceptance level the customer has with an amount of personalization on the channels and a type of personalization on the channels, wherein the type of personalization on the channels comprises aesthetics, textures, color, and font;
   generating a persona for the customer acceptance level with channel personalization utilizing a rules set and clustering datasets;
   forecasting the channel personalization utilizing the machine learning engine, the persona, and the rules set, wherein the rules set comprises customer accounts, customer inputs, and comparing similar customers and the customer inputs;
   providing the customer with a value exchange for an additional personalization of a customer interaction, wherein the additional personalization of the customer interaction allows for customer control of use and distribution of information;
   receiving inputs from the customer for the additional personalization of a customer interaction and updating the custom interfaces and the channels via the application builder interface;
   executing updates to the custom interfaces and the channels based on the inputs from the customer;
   presenting a customized level of personalization of channels to the customer, wherein the customized level of personalization of the channels is based on a customization level confidence, the persona, and the additional personalization of the customer interaction;
   continually monitoring the level of personalization of channels for the customer;
   performing correction adjustment to the level of personalization of channels based on the monitoring;
   capturing micro-movements to determine micro-changes to customer responses based on colors, regional dialects for audio presentation, fonts, and items displayed on screens;
   performing micro-movement analysis to capture micro changes to the customer responses to channels and perform real-time micro-movement adjustments to the personalization of the channels, wherein the real-time micro-movement adjustments modify patterns in the regional dialect, the items displayed on screens, and the fonts and colors of the channels; and
   providing a feedback loop model for customer acceptance level to the forecasting database based on the customer acceptance, use of the personalization of the channels, and the persona.

14. The computer-implemented method of claim 13, wherein performing a clustering analysis further comprises creating a micro-moment personalization eco-system for user interaction with an entity via the channels, wherein the rules set and clustering analysis compares the customer acceptance level for personalization of interactions on the channels, by generating personas of group of customers into clusters of receiving more or less personalization.

15. The computer-implemented method of claim 13, wherein generating the forecasting database further comprises receiving a request for a level of personalization from the customer and generating a forecast database of future elements personalization.

16. The computer-implemented method of claim 13, wherein the customer customization level confidence further comprises a machine learning application of historic customer customization for identification of an acceptable level of customization and matching the acceptable level in displaying information to the customer.

17. The computer-implemented method of claim 13, wherein the feedback loop model further comprises continually monitoring the level of personalization of channels for the customer and identify activity changes in the customer on the channels including identifying less activity by the customer on a specific channel and/or more activity by the customer on a specific channel and generate a customization to deploy information from the customer to future customers by inputting the activity changes into the feedback loop model.

* * * * *